United States Patent [19]
Andersen et al.

[11] 3,967,247
[45] June 29, 1976

[54] STORAGE INTERFACE UNIT
[75] Inventors: Vernon K. Andersen, New Brighton;
Michael W. Goddard, Roseville,
both of Minn.
[73] Assignee: Sperry Rand Corporation, New York, N.Y.
[22] Filed: Nov. 11, 1974
[21] Appl. No.: 522,553

[52] U.S. Cl. ............................................. 340/172.5
[51] Int. Cl.² .................... G06F 13/00; G11C 9/06
[58] Field of Search ...................... 340/172.5; 444/1

[56] References Cited
UNITED STATES PATENTS

| | | | |
|---|---|---|---|
| 3,394,353 | 7/1968 | Bloom et al. | 340/172.5 |
| 3,569,938 | 3/1971 | Eden | 340/172.5 |
| 3,588,839 | 6/1971 | Belady et al. | 340/172.5 |
| 3,647,348 | 3/1972 | Smith et al. | 340/172.5 |
| 3,670,309 | 6/1972 | Amdahl et al. | 340/172.5 |
| R26,624 | 7/1969 | Bloom et al. | 340/172.5 |

Primary Examiner—Gareth D. Shaw
Assistant Examiner—Michael C. Sachs
Attorney, Agent, or Firm—Thomas J. Nikolai; Kenneth T. Grace; Marshall M. Truex

[57] ABSTRACT

A storage interface unit adapted to serve as a high speed buffer between plural requestor units and a relatively low speed main memory in a data processing system. The high speed buffer provides temporary storage for a limited number of blocks of data stored in the main memory. When a particular address is requested by a requestor unit, a check is made to determine if that address is resident in the high speed buffer and if so, it is available to the requestor unit for reading or writing. If the desired address is not resident in the high speed buffer, a block in the buffer is selected for replacement. In accordance with the present invention, when a block is to be displaced from the buffer and a new block is requested from the main memory, during the interval that the new block is requested from the main memory, the block to be displaced is checked for modifications. If any word of the old block has been modified since it was obtained originally from main memory the entire block is read into a temporary holding register and is restored in the main memory while the new block is being entered into the buffer storage.

2 Claims, 11 Drawing Figures

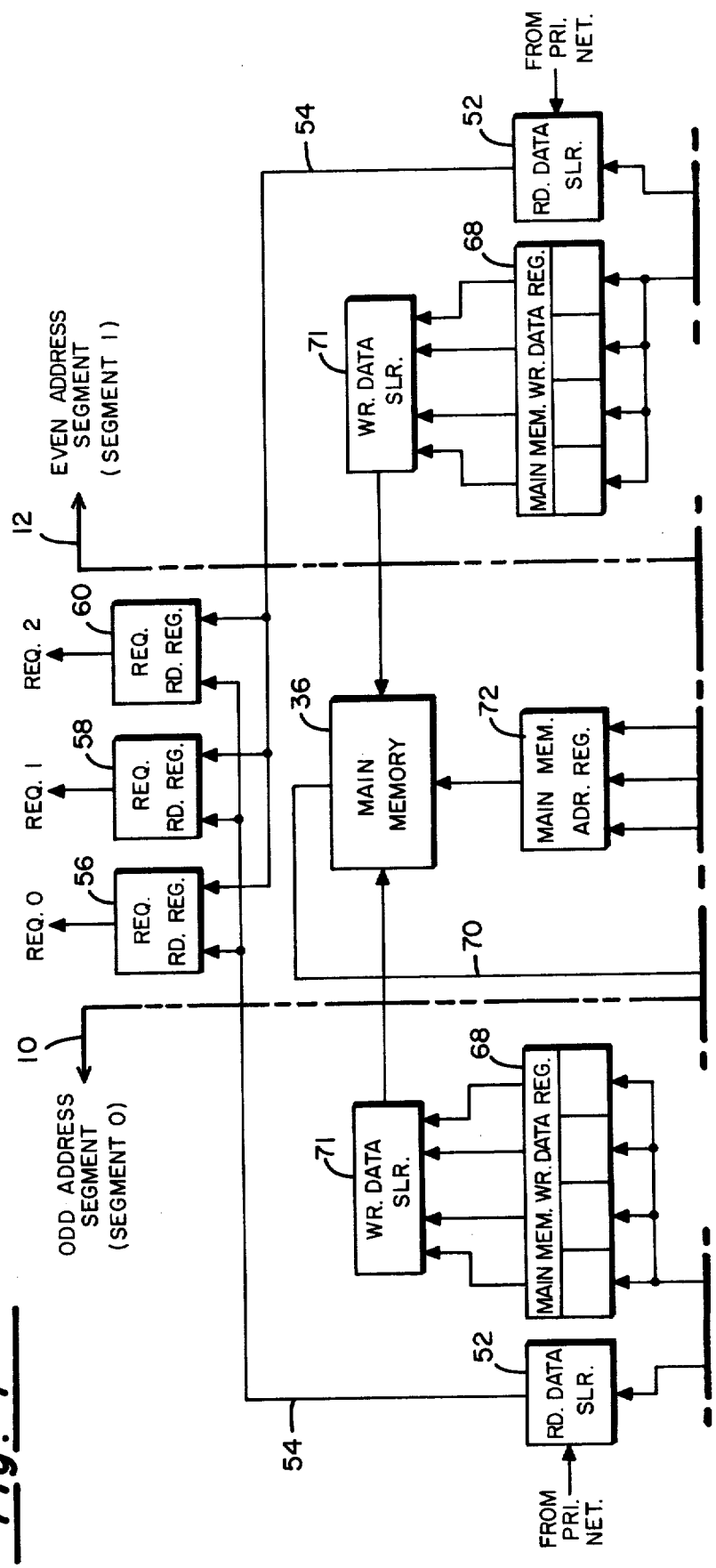

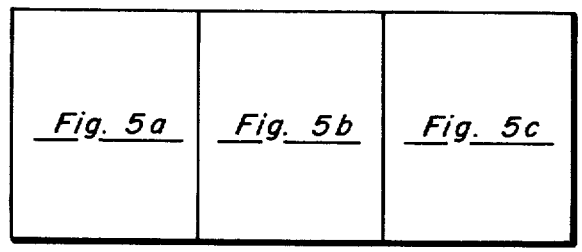
_Fig. 5_
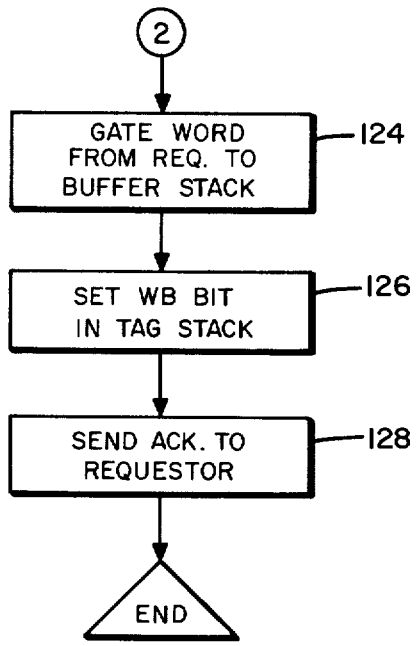
_Fig. 5c_

STORAGE INTERFACE UNIT

BACKGROUND OF THE INVENTION

It has long been recognized that the speed of a computer memory system can be increased through the use of a relatively high speed, low capacity buffer store. That is, if a high speed buffer is implemented properly in a computer system, main memory speed will appear to approach that of the buffer. For example, in a case where the cycle time of the buffer is one-tenth of that of the main memory, the effective access time may be eight to nine times less than that of the main memory. The underlying reason for this speed-up of operation is that experience has shown that data currently being processed have a high probability of being used again in the near future and that related data is commonly stored in contiguous address locations in the main memory.

The manner in which so-called "cache" buffers have been implemented in various IBM computer systems has been described in a number of published technical articles. For example, reference is made to the article by J. S. Liptay entitled, "Structural Aspects of the System/360 Model 85, II the Cache", *IBM Systems Journal*, Vol. 7, No. 1, pp 15–21; that by D. H. Gibson entitled "Considerations in Block-Oriented Systems Design", *Spring Joint Computer Conference* 1967; and that by C. J. Conti et al entitled "Structural Aspects of the System/360 Model 85,I General Organization", *IBM Systems Journal*, Vol. 7, No. 1, 1968. In the IBM System 360-Model 85, store operations always cause the main memory to be directly updated. If the main storage sector being changed has a sector in the buffer assigned to it, the buffer is also updated; otherwise, no activity related to the buffer takes place. Therefore, store operations cannot cause a buffer sector to be reassigned, a block to be loaded, or the activity list controlling the replacement algorithm to be revised.

The present invention is considered to be a significant improvement over the memory hierarchy employed in the IBM system. In accordance with the teachings of the present invention, one or more processor units and/or Input-Output devices are adapted to receive instructions and operands (hereinafter collectively referred to as "data") from a main memory only by way of a high speed buffer memory. Also, data from the processors and/or I/O units to be stored in the main memory must pass through the high speed buffer memory. Thus, the buffer of the present invention will hereinafter be termed a "Storage Interface Unit" or "SIU".

The SIU of the present invention is a high-speed (low cycle time) storage buffer designed to reduce the overall storage delay time of a computing system by automatically allowing the great majority of storage references to take place in the SIU proper, rather than in the lower speed (higher cycle time) main memory or backing store. In the preferred embodiment of the present invention, this is accomplished by providing circuitry (hardware) to transfer an 8-word block of data into the SIU whenever any word from that block is required by a processor or input/output unit. This block becomes one of several blocks remaining resident in the SIU until it is displaced by a new current block as determined by a suitable replacement algorithm.

The SIU of the present invention employs a so-called set-associative storage buffer. In an exemplary arrangement, the buffer may comprise 4,096 words of storage which may be divided into 128 sets, each set consisting of four 8-word blocks of data. The main memory employed in the system is then also divided into 128 sets, each set containing 1/128 of the words in the total main memory address range. Alternatively, the buffer may be expanded to contain additional words of storage divided into a larger number of sets with each set consisting of four 8-word blocks of data. In this alternative arrangement, the main memory would also be divided into an identical number of sets but each set would include a lesser number of 8-word blocks. Any one of the 8-word blocks in a given main memory set may be placed in any one of the four 8-word blocks in the corresponding SIU set. When a transfer (either a read or a write) is made between the SIU and main storage, an 8-word block from contiguous addresses is transferred during a single main memory cycle.

When a request for a word from storage is made by a processor or an input/output unit, this request is seen only by the SIU. Conventional direct address selection is used to address the one of 128 sets in which the required word is located. This selection causes the SIU to simultaneously read the address of each of the four blocks currently resident in the set and to compare each with the requested address. If one of the four block addresses matches the requested address, the appropriate word is read from that block and sent to the requesting unit. If none of the four block addresses matches, an immediate request is made by the SIU to the main memory for the entire block which contains the desired word. While waiting for this new block of data, the SIU determines which of the four current blocks is the least recently used and marks it for replacement. Next, the SIU checks the block to be replaced to determine whether any word in that block has been modified while resident in the SIU. If a modification had occurred, the entire block plus its address is read into a temporary holding register in the SIU so that it can be restored to the main memory as soon as the current main memory cycle is finished. When the data arrives from the main memory, it is stored into the now-vacated block and the appropriate word is ultimately sent by the SIU to the original requestor to complete the cycle.

In prior art computing systems wherein high speed buffers are employed to increase the throughput of the system, store operations always cause the main memory to be updated. If the main memory set being changed has a corresponding set in the buffer assigned to it, the buffer is also updated. That is, each time a processor or I/O unit effects a write operation, the main memory must be updated immediately. Since the main memory operates at a relatively long cycle time, frequent references to main memory slow down the overall processing speed of the system.

The system of the present invention utilizes what is termed a "post-store" method to obviate this problem. Rather than making a write reference to the main memory each time a write is effected in the SIU buffer memory, in the system of the present invention the main memory is only updated when the address to be modified is not resident in the buffer and a block containing altered data, i.e., data different from what is in its corresponding block in main memory is selected for replacement. Upon detecting that a desired address is not resident in the SIU buffer, the SIU immediately sends a "read" request to the main memory to obtain the entire block in which the desired address is located. Simultaneously the SIU, through a replacement algorithm, determines which of the blocks currently in the buffer memory is to be replaced. A check is made to determine if this selected block had its contents modified while resident in the buffer and if so, the entire block plus its address is gated into a temporary holding register. While the new block is being brought into the buffer from the main memory and stored in the now-vacated block location, the displaced block contained in the holding register is written back into the main memory, thereby updating the main memory.

The economy in time occasioned by this "post-store" method is readily apparent. Rather than requiring a relatively slow main memory cycle each time a change is made in a block stored in the buffer to update the main memory as in prior art systems, in the system of this invention only one main memory cycle is used to update main memory and this only occurs when a block is selected for replacement which had its contents modified while it was resident in the buffer. However, while resident in the buffer, this block may have undergone many, many modifications before being selected for replacement.

OBJECTS

It is accordingly an object of the present invention to provide an improved buffer memory system for a digital computing system.

Another object is to provide an improved storage interface unit between one or more requestors and a main memory which unit contains a high speed buffer memory which, on a statistical basis, has a high probability of containing a word address specified by the requestor.

Another object is to provide an improved memory architecture for a digital computing system permitting repeated modifications to a given block of data resident in a high speed buffer without the need of effecting a corresponding modification to the associated block in the main memory each time the block in the buffer is modified.

These and other objects and advantages of the invention will become apparent to those having skill in the art upon a reading of the following detailed description taken in conjunction with the accompanying drawings in which:

DESCRIPTION OF THE DRAWINGS

FIGS. 1a and 1b when arranged as shown in FIG. 1 depict a system block diagram of the SIU in which the present invention is used;

FIGS. 5a, 5b and 5c when arranged as indicated in FIG. 5, show by means of a flow diagram the sequence of the various operations performed by the preferred embodiment.

DESCRIPTION OF THE PREFERRED EMBODIMENT

Figure 1B:
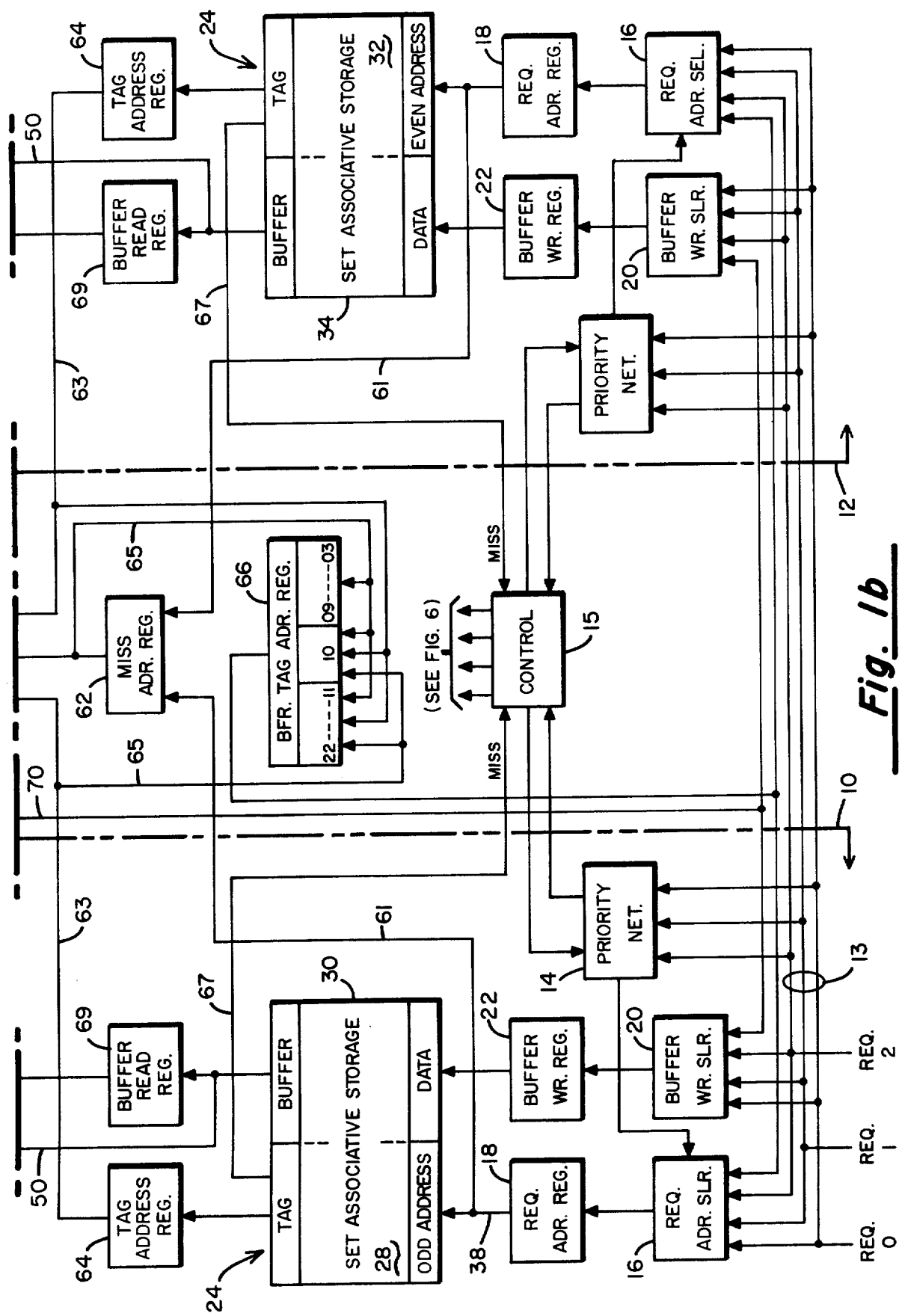

Referring now to FIG. 1, there is shown a system block diagram of the preferred embodiment of the invention. This drawing will be used in explaining the organization and functional operation of the SIU and following this explanation will be a description of the construction and mode of operation of the various blocks of FIG. 1 which are other than conventional.

As has been mentioned in the introductory portion of this specification, the present invention relates to a Storage Interface Unit (SIU) which operates as a high speed buffer between plural requestor units and a main memory in such a way that the overall memory access time for a given operand is substantially decreased. This is accomplished by including as an interface between the requestor units and the main memory a high speed buffer memory which contains a subset of the information stored in the main memory. The design is such that on a statistical basis there is a high probability that a given operand being sought by a requestor unit for reading or writing will be found in the high speed buffer, thereby obviating the necessity of making a reference to the lower speed main memory.

The system illustrated in FIG. 1 includes two segments denoted "odd segment" and "even segment" which are substantially identical in construction, mode of operation and which operate in parallel. Hence, in the following detailed description reference will be made to the various functional elements in the odd segment, i.e., those to the left of the section line 10, but it is to be understood that what is said about those elements also holds true for those to the right of the section line 12. Elements which are shared by both segments are shown between the section lines 10 and 12.

Shown at the bottom of FIG. 1 are the plurality of input lines 13 which originate at the requestor units and which are used to present request control signals, address representing signals and data to be written to the SIU. The requestor units may comprise one or more central processing units (CPU's) and input/output units (IOU's). While only three such units (Reg. 0, 1, 2) are indicated, it is to be understood that additional requestors may be used. The incoming request signals are applied to priority networks 14 in each SIU half which, upon receipt of simultaneous requests from two or more requestor units, award priority to one and only one unit at a time for communication with the SIU. Both the CPU's and IOU's communicate with the SIU on a Request/Acknowledge basis. This mode of communication is fully explained in the Ehrman, et al U.S. Pat. No. 3,243,781, so that it is felt to be unnecessary to explain in further detail the construction or organization of such requestors. That patent also shows the manner in which plural request signals originating at different units are applied to a priority network which selects one such unit at a time for communication with the remainder of the system.

Presented along with the request signal is an address which uniquely selects a desired word for reading or for modification in the event that the request signal is a read or a write request, respectively. These address representing signals are applied as inputs to the requestor address selectors 16. The selectors 16 are merely gating devices responsive to control signals emanating from the priority circuitry 14 which permit the address signals from a single requestor selected by the priority network to pass through to the requestor address registers 18. In a similar fashion the buffer write selectors 20 are conventional gating arrangements which permit write data from the selected requestor to be entered into the buffer write registers 22.

The outputs from the requestor address registers 18 and the requestor write registers 22 are made available to the two Set Associative Storage Units (SASU) identified generally by the numerals 24 and 26. The SASU 24 is used to store the odd address of plural blocks while SASU 26 stores the even addresses in these same blocks. The storage units 24 and 26 may be conventional addressable random access memories, but are divided into two parts termed the "tag" and the "buffer". More specifically and as will be further explained with the aid of FIGS. 2 and 3, the SASU 24 has a first stack of addressable registers 28 for storing so-called tag words and a second stack of addressable registers 30 for storing plural sets of four 4-word half blocks of data. Similarly, the SASU 26 is divided in two parts, 32 and 34, part 32 storing tag words and part 34 storing plural sets of four 4-word half blocks of data. There is one tag word in the sections 28 and 32 for each of the 4-word half blocks stored in the sections 30 and 34.

To gain a clearer understanding of the overall organization of the SIU, it is deemed helpful to consider an exemplary embodiment. However, it is to be understood that the storage capacities to be set forth are a matter of choice and no limitation to the figures presented should be inferred.

Let it be assumed that the buffers 30 and 34 have a combined capacity of 4,096 words of data and that the main memory 36 has a capacity of 262,144 words. In this exemplary configuration, the buffers may be partitioned into 128 sets of four 8-word blocks (128 × 4 × 8 = 4,096 words). The main memory may then also be considered as being comprised of 128 sets, each set containing 1/128 of the word capacity of the main memory. In the example, then, each set would contain 256 8-word blocks (128 × 256 × 8 = 262,144 words). Any four of the 256 8-word blocks of a set in main memory may be resident in a corresponding one of the 128 sets in the combined buffers 30 and 34.

To speed up the addressing of data stored in the SIU buffers, the SIU is divided into an odd address segment and an even address segment so that under certain conditions to be explained, buffer access can be accomplished in an overlapped fashion. The odd/even segmentation affects the set/block structure by dividing each 8-word block into two 4-word half blocks. Thus, buffer 30 may store the 2,048 words having odd addresses and buffer 34 may store the remaining 2,048 words having even addresses. This odd/even address structure is displayed below in Table I.

TABLE I

| 4 8-Word Blocks | | 4 4-Word Half Blocks | 4 4-Word Half Blocks |
|---|---|---|---|
| A B C D | ← BLOCK → | A B C D | A B C D |
| E E E E | | E E E E | O O O O |
| O O O O | | E E E E | O O O O |
| E E E E | | E E E E | O O O O |
| O O O O | | E E E E | O O O O |
| E E E E | | | |
| O O O O | | | |
| E E E E | | BUFFER 34 | BUFFER 30 |
| O O O O | | | |

Set forth below in Table II (for exemplary purposes only) is the format adopted for the address provided by the selected requestor units and employed to access information stored in the SASU's 24 and 26 or in the main memory 36 in those instances where the address being sought for reading or writing is not resident in the SASU's. Again, this format is premised on the use of a single main memory module 36 having a storage capacity of 262,144 words and a combined buffer having a capacity of 4,096 words. If additional memory modules are employed, additional address bits would be required for module selection.

TABLE II

| 22 — 10 | 9 — 3 | 2 — 1 | 0 |
|---|---|---|---|
| BLOCK SEL. | SET SEL. | WD. SEL. | O/E SEL. |
| |← MAIN MEMORY ADDRESS →| | | |
| 20 | 3 | | |

Figure 2:
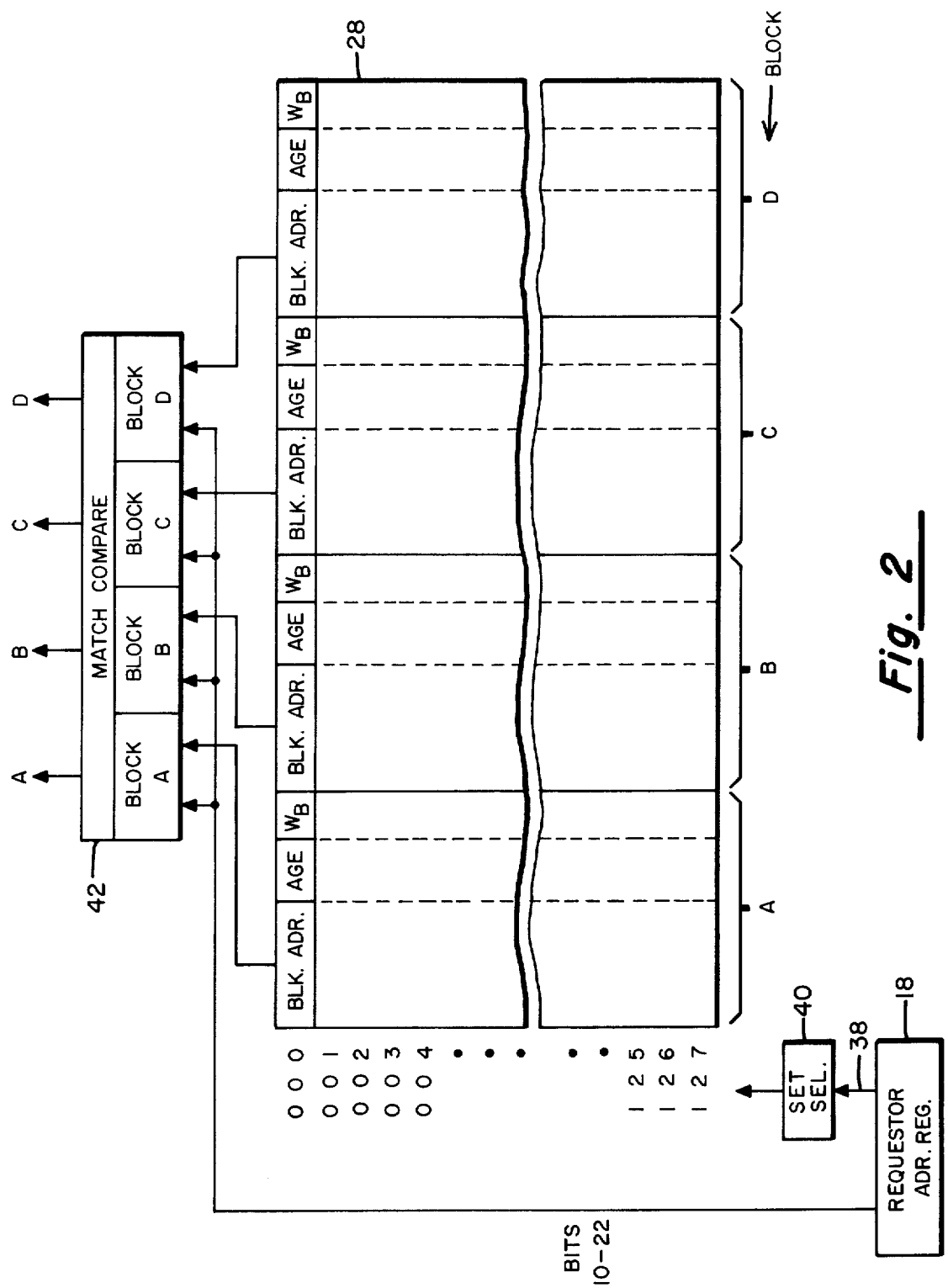
FIG. 2 is a block diagram representation of the tag portion of the set associative storage modules.

FIG. 2 illustrates diagrammatically the makeup of the tag parts 28 and 32 of the SASU's 24 and 26 and before proceeding with the system description shown in FIG. 1, consideration will be given to the organization and operation of the odd segment SASU 24, it being understood that the even segment SASU 26 operates in an identical manner.

The SASU 24 involves conventional addressing in both the tag and buffer portions thereof. The output from the requestor address register 18 is applied via cable 38 to an address translator 40 in SASU 24 which functions to examine bits 3 through 9 of the address to uniquely select one out of 128 lines used to access any one of the 128 registers comprising the tag memory. Stored in each tag memory register is a 64-bit entry, each having the format shown at set address 0 0 0 in FIG. 2. The part of the tag word labeled "block address" includes bits 10–22 of the address of the first word in each of the four blocks comprising that set in the buffer, a block being eight contiguous words located on eight word boundaries.

The entries labeled "age" are each a 2-bit field associated with each of the four block addresses in each tag location that provide a relative indication If how long it has been since each block has been referenced. More will be said of this age field when the details of the "least recently used" replacement algorithm are explained.

The field labeled "WB" is termed the "Writeback Bit" and is one bit wide and is used to indicate whether modified data exists in the specified block. If this bit is a binary "1" when the block in question is selected for replacement, all four words in that block must be written back into main storage. When it is a binary "0" there is no need to write the displaced block into main memory, since no word in that block had been modified by a write operation while it was resident in the buffer.

To determine whether a desired block is resident in the buffer, the four block addresses of the tag associated with the requested set are compared, bit-by-bit, with bits 10 through 22 of the address present in the requestor address register 18 (FIG. 2). If one of the four block addresses match, as determined by a Match Compare circuit 42, the requested word is resident in the buffer and can be obtained directly from the buffer. Because the buffer sections are addressed with the set number (bits 3–9) and the bits identifying a word within the block (bits 1–2), its output is four words wide, one word from each of the four blocks in the requested set. The output from comparator 42, which identifies the block number in which the match occurred, is used to select the appropriate word from the buffer to send it to the requestor as will next be explained.

Figure 3:
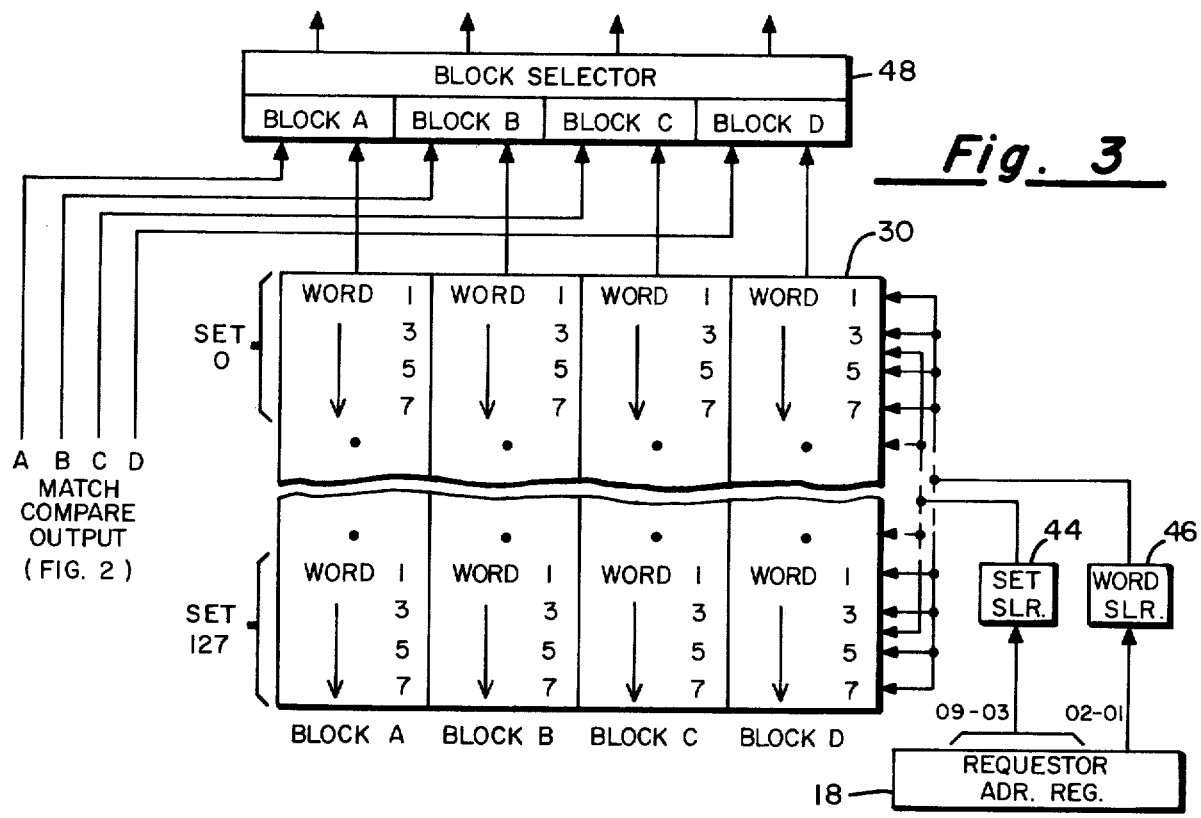
FIG. 3 is a block diagram representation of the buffer portion of the set associative storage modules.

Referring to FIG. 3, there is shown the organization of the buffer portion 30 of the SASU 24. Buffer 34 is identical in construction. The buffers per se each comprise a plurality of addressable registers for storing data. The individual words are grouped into 128 sets, each containing four 4-word half blocks, the even addresses being stored in buffer 34 and the odd ones in buffer 30. To access a given word, bits 09 through 03 of the requestor address selects one of the 128 sets stored in the buffer. Bit 0 of the requestor address register is decoded to specify whether the address is odd or even such that buffer 30 or 34 should be accessed, respectively, and bits 02 and 01 of the requestor address register are translated by the word selector 46 to uniquely select one of the four words in each block within a given set in the specified odd or even segment. Because the same requestor address is simultaneously applied to the tag stack (FIG. 2), if a match occurs between the address of a requested block and the address of a block resident in the buffer, an output signal will be developed on one of the lines A, B, C, D from the comparator 42 of the specified odd or even segment. This output signal, when applied to the inputs of the block selector 48 (FIG. 3) will permit only the selected word of the selected block of the selected set in the selected segment to be read out from the buffer 30 or 34 of the SASU 24 or 26. Of course, if the desired block is not resident in the buffer, match compare circuit 42 will fail to produce an output signal on either output line A, B, C, or D and selector network 48 will be precluded from gating any word out from the buffer 30.

Words sent out from the SASU buffer segments 30 and 34 may be passed over the cables 50 (FIG. 1) to read data selectors 52 which are controlled by the priority network 14. The read data selectors function to gate these words over cables 54 to the particular one of the read registers 56, 58 or 60 of the requestor unit which presented the read request to the SIU in the first instance.

In the event that a read or a write request is presented to the SIU and a determination is made that the word being sought is not resident in the buffer, the desired address from the requestor address registers 18 is transferred via cable 61 to the miss address register 62 where it is captured and held for later use. Next, the least recently used (LRU) algorithm is invoked which causes the tag address associated with the block to be replaced to be read out from the tag segment 28 or 32 to the associated tag address register 64 and from there, by way of cables 63 and 65, to the buffer tag address register 66.

Following this, during four buffer memory read cycles, the two 4-word half blocks singled out for replacement are read out from the buffer sections 30 and 34 of the SASU's and loaded one-by-one into the four sections of the main memory write data registers 68 where they are held.

The desired non-resident block of data is read out two words at a time from the main memory 36 in four cycles on cable 70 and applied through the buffer write selectors 20 to the buffer write registers 22. The replacement block obtained from the main memory is stored at the beginning buffer address designated by the contents of the buffer tag address register 66 and as each word is entered, the bits 1 and 2 are incremented to provide the word address for each entry. Also, a new tag word is written into the tag sections 28 and 32 of the SASU's in a manner yet to be described.

While these operations are in progress, the writeback bit of the portion of the tag word presently contained in the tag address register 64 is checked and if set, it indicates that the block now resident in the main memory write data registers 68 had undergone modification while resident in the buffer. As such, it is necessary to write this block back into the main memory.

During four main memory cycles, words are unloaded two at a time from the registers 68 (one from the odd segment and one from the even segment) and stored in the main memory at the block location specified by the address which had been earlier captured in the miss address register 62. More specifically, the contents of the miss address register 62 are applied to the main memory address register 72.

After the last word of read data from the main memory unit 36 has been entered into the buffer, another priority scan is initiated, thereby allowing the original requestor to gain access to the now-resident address in the buffer. The desired word is therefore made available to the original requestor for reading or writing.

To understand the operation of the least recently used (LRU) algorithm, which is the means utilized to select a block for replacement when a request is presented for a word which is not resident in the buffer, reference will be made to the circuitry of FIG. 4.

It will be recalled from the explanation of the tag portion of the SASU (FIG. 2), that each set has a tag word specifying the address of the four blocks currently resident in the buffer as well as a pair of "age" bits for each block which may have the binary values 00, 01, 10, or 11. By convention, the block with the age bits equal to 00 is the most recently used (youngest) block and that with the age bits 11 is the least recently used (oldest) block. Therefore, when it is desired to replace a block in a set in the buffer with a new block from the main memory, the control circuits need only examine the age bits of the blocks in the set being addressed and select the one having the age bits equal to 11 for replacement.

Figure 4:
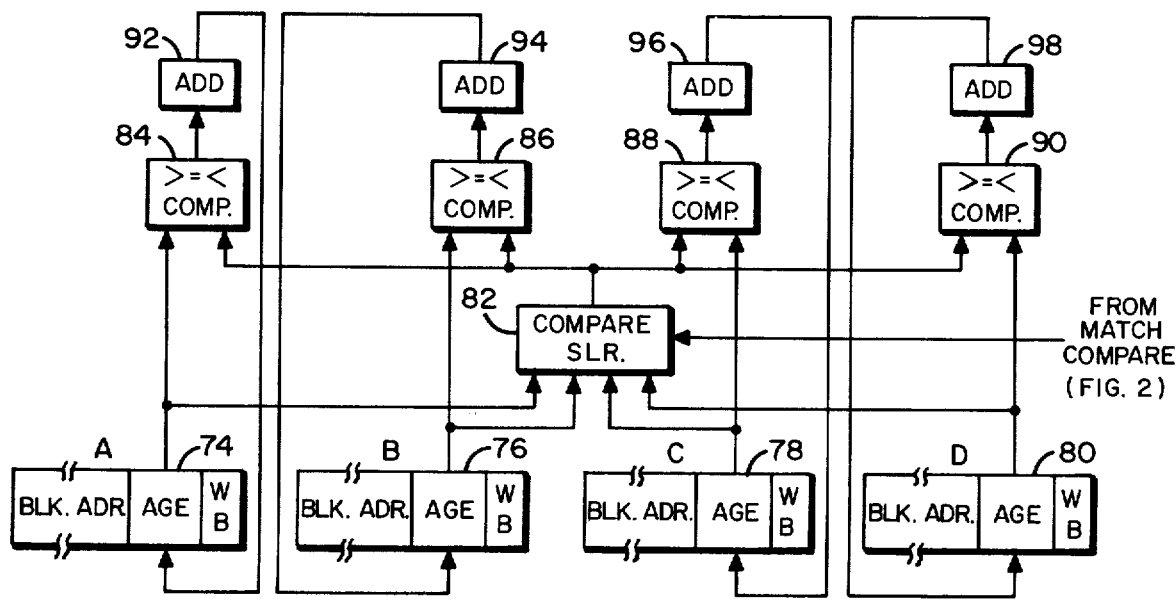
FIG. 4 is a logic diagram illustrating the circuits used to implement the "least recently used" algorithm.

The circuit of FIG. 4 illustrates the means employed in the preferred embodiment for updating the age bits of a set tag word each time a block in that set is referenced. Located at the bottom of the figure are four registers 74, 76, 78 and 80 which may be a part of the match compare circuit 42 in FIG. 2. Upon the application of a tag address to the set selector 40 from the highest priority requestor, the tag word for that set is entered into the match compare circuit 42 with the block address age bits and writeback bit for block A being entered into register 74, those for block B into register 76, etc.

The age bits from each register 74–80 are applied to a compare selector network 82 and to individual "greater than, equal to, or less than" comparators 84, 86, 88 and 90. The output of compare selector 82 is also connected as an input to each of the comparators 84–90. Individually associated with the outputs of each of the comparators 84–90 is an adder network 92, 94, 96 and 98 which has its output coupled back to a corresponding one of the registers 74–80. As will be explained, the adders, upon receipt of an output from the comparators 84–90, are capable of adding 1 or 0 to the age bits in the registers 74–80 or of clearing such age bits to 0.

As an example, let it be assumed that the age bits in registers 74–80 are 00, 10, 01, and 11, respectively, and that the match compare logic 42 of FIG. 2 produces an output on line B indicating that that block in a given set (as determined by the set selector 40) is being addressed. The selector/comparator 82 receives an input on line 100 from the match compare circuit 42 causing the age bits 10 to be applied to a first input of each of the comparators 84–90. The binary number 10 is therefore compared with the age bits in each of the registers 74–80. When the binary number 10 from the unit 82 is compared with the assumed age bits 00 in comparator 84, an output will be generated indicating that the age bits in register 74 are less than the selector/comparator 82 output bits 10 and the adder will be operative to add 1 to the contents of register 74.

When the output from the comparator selector 82 is compared to the age bits in register 76 the two will be found to be equal and the adder 94 under this condition will output a signal to clear register 76 to 0. The comparison of the age bits in register 78 with the selected block age bits by comparator 88 will cause the adder 96 to add 1 to the contents of register 78 in that the age bits contained in register 78 are assumed to be less than the selected age bits 10.

Because the age bits assumed for register 80 have a greater binary value than the bits from the match compare network 42, comparator 90 will produce an output causing 0 to be added to the contents of the register 80. Following this updated operation, then, the age bits for the blocks in the selected set will be 01, 00, 10 and 11, indicating that block B has been the most recently used block and block D remains the least recently used block.

To summarize, comparators 84–90 determine whether the current age bits in the registers 74–80 are greater than, equal to, or less than the age bits of the tag of the selected block of the selected set and the adders 92–98 are respectively operable under the above three conditions to add 0, clear, or add 1 to the age bits in the registers 74–80. Upon each reference to a set, then, the age bits of the tag or that set are updated to identify the least recently used (accessed) block in that set.

Since greater than, equal to or less than comparators are known in the art, it is uncessary to set forth herein specific circuits for implementing same. One desiring more information on such circuits may refer to the Kimbara U.S. Pat. No. 3,293,603 or to various text books relating to the logic design or digital comparator networks.

SYSTEM OPERATION

Figure 5A:
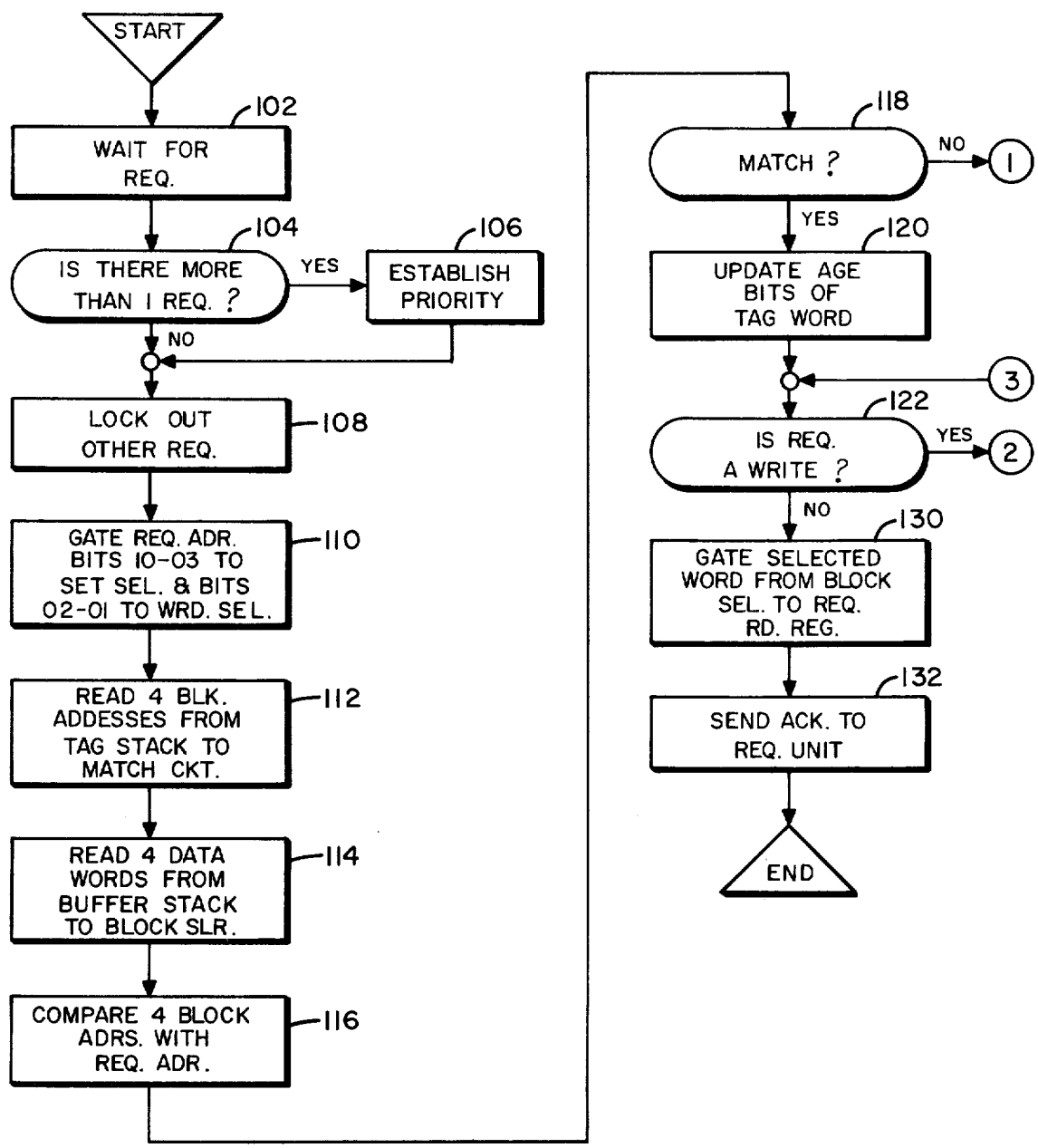
Figure 5B:
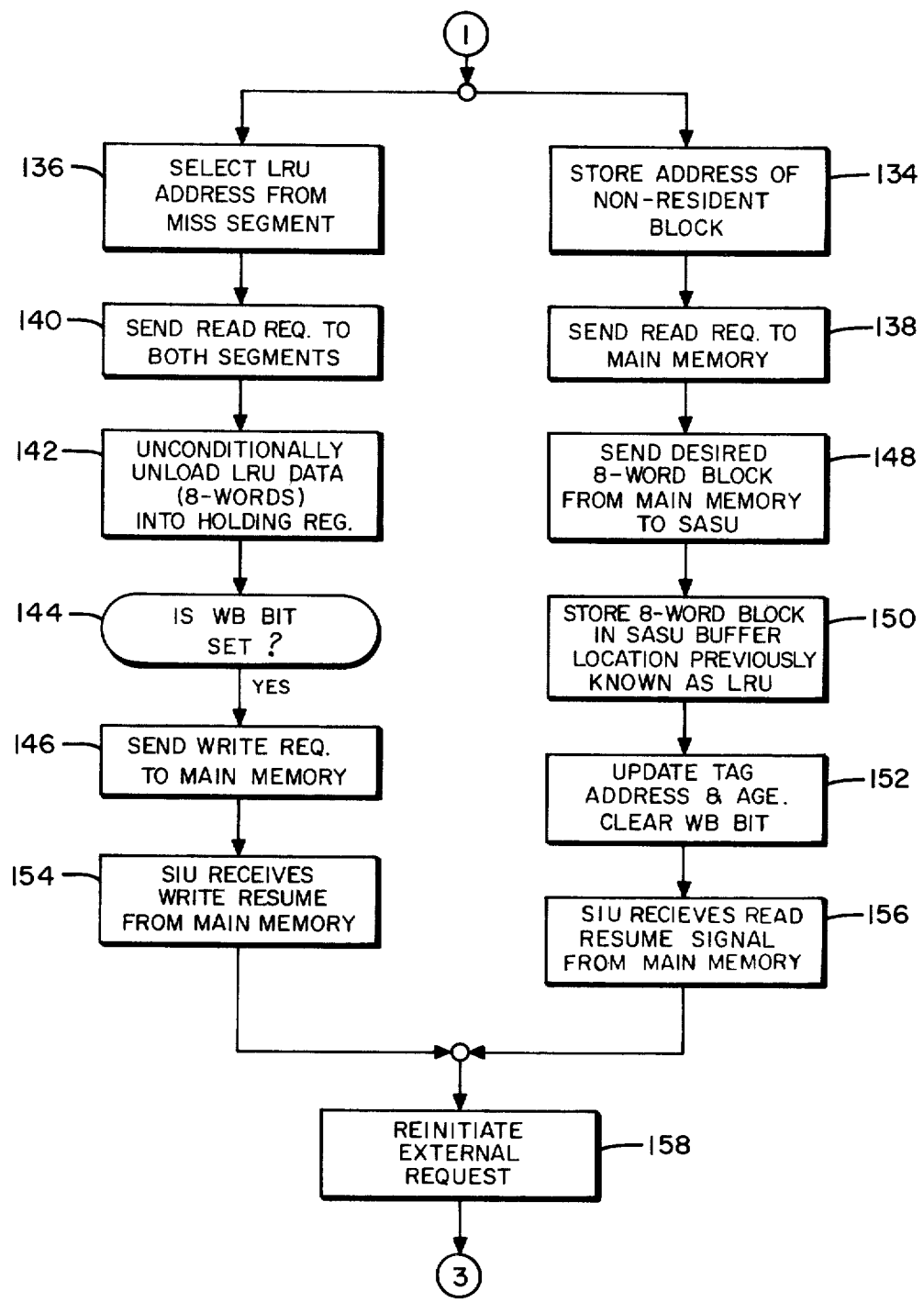

The flow diagrams of FIGS. 5a, 5b and 5c will now be considered as an aid in the understanding of the operation of the system of FIG. 1. The operation begins with the priority network 14 standing ready to accept incoming requests from the plural requestor units connected to the SIU input bus 13. This operation is represented by box 102 in FIG. 5a. Upon receipt of either a "read" or a "write" request control signal, a determination is made as to whether more than one requestor is presenting such a request (box 104). If so, the priority network 14 (FIG. 1) selects one and only one such requestor for communication (box 106) and if not, all other requestors, except the one presenting the request, are locked out for the duration of the ensuing read or write operation (box 108).

The priority network 14 sends an enable signal to the selected requestor causing bits 09–03 of the requested address to be gated to the set selector 40 and 44 (FIGS. 2 & 3) of the tag and buffer portions of the SASU's 24 and 26. At the same time, bits 02 and 01 of the address presented by the requestor are gated to the word selector 46 (FIG. 3). These gating operations are represented by box 110 in the flow diagram of FIG. 5a.

Next, the SASU is cycled and the tag word for the selected set is read into the match compare circuit 42 and four data words from the selected blocks of the selected set are entered into the block selector 48 (FIG. 3). These operations are indicated by flow diagram boxes 112 and 114.

Next, the block addresses of the four blocks comprising the selected set and contained in the match compare circuit 42 are compared bit-by-bit with the address presented to the SASU. This operation is signified by box 116 in FIG. 5a. If a match results from this comparison (box 118), an output control signal is developed on one of the lines A, B, C, or D emanating from the match compare circuit 42. This signal is applied via line 100 to the compare/selector 82 (FIG. 4) to thereby cause the "age" bits of the tag word in match compare circuit 42 to be updated at the appropriate time, as previously described. If no match results, the sequence of operations branches to those shown in FIG. 5b as represented by the flow diagram branch connector symbol ① emanating from box 118. For purposes of explanation, however, let it be assumed that a match occurred and that the age update operation represented by box 120 in FIG. 5a is accomplished by the circuits illustrated in FIG. 4.

After the age bits of the tag word of the selected set are updated, a determination is made as to whether the request which had been honored by the priority network 14 is a "read" request or a "write" request (box 122). Assuming that it is a write request, the sequence of operation set forth in the flow diagram of FIG. 5c are executed as signified by the connection symbol ② exiting from the decision symbol 122 and heading up the flow chart of FIG. 5c.

Under the assumed condition of a write request, a write enable signal is presented to the SASU buffer allowing the data word stored in the buffer write register 22 to be written into the word location in the buffer stacks 30 or 34 determined by the address resident in the requestor address register 18. This operation is represented by box 124 in FIG. 5c. Because the write operation causes the data stored in a block in the buffer to be different from the data stored in the corresponding block in the main memory, it will be necessary to write the modified block into the main memory once it is selected for replacement by the LRU algorithm. To indicate that a modification has occurred, the writeback bit (WB) of the portion of the tag word for the modified block is set as indicated by the box 126 of FIG. 5c. Finally, an acknowledge signal is returned to the selected requestor unit advising that unit that the data word it provided has been written into the high speed buffer (box 128) and the sequence is terminated. This releases the priority network 14 and it is permitted to scan for new requests.

Had the original request been a read request, the sequence of operations would not have exited to FIG. 5c, but instead would have continued on to those signified by box 130 in FIG. 5a. That is, the selected word of the selected block of the selected set is gated through that block selector 48 (FIG. 3) to the read data selector 52 (FIG. 1) and from there to the read register 56, 58, or 60 of the requestor which originally gained priority. The SIU control then forwards an acknowledge control signal to the requestor unit having priority advising it that the desired word is present in its read data register and can be acquired therefrom (box 132).

Referring back now to the flow diagram (box 122) in FIG. 5a, the foregoing explanation was premised on the assumption that when the addresses of the four blocks in the selected set were compared to the requested address in the match compare circuit 42, that a match, in fact, resulted. Next, it will be assumed that this comparison resulted in a miss condition so that the sequence of steps indicated by the flow chart of FIG. 5b are effected.

Upon the detection of a miss, the match compare circuit 42 of the segment which is being addressed issues a control signal on control line 67 which is applied to the SIU control network 15. As will be further explained when the details of the control network 15 are considered, the receipt of the miss control signal from either segment (odd or even) initiates the running of a delay line type command enable generator, such that various commands are issued by the control unit at predetermined times to thereby control the exchanges of data between the high speed buffer and the lower speed main memory. Because of the difference in cycle times between the high speed buffers 30 and 34 and the main memory 36, it is possible to execute various operations in parallel or overlap fashion. With references to FIG. 5b, the overlapped operation is represented by the two parallel branches in the flow diagram. However, it should be understood that the flow diagram of FIG. 5b is intended only to indicate the relative sequence of operations, but not the specific timing relationships between the operations indicated in the two parallel paths.

The first operation to be performed upon receipt of the miss signal by the control unit is for the control unit to issue a command which causes the address of the non-resident block to be stored. This is the address provided by the requestor which had previously been awarded priority. Specifically, the command from the control unit causes the contents of the requestor address register 18 to be transferred via the lines in cable 61 to the miss address register 62. This operation is represented by the box 134 in FIG. 5b. At the same time, the circuit of FIG. 4 operates in the manner previously described to identify the particular block A, B, C or D in the match register 42 which has the age bits equal to 11, i.e., the least recently used block. The block address bits, the age bits and the WB bit associated with the least recently used block are read out from the tag memory into the tag address register 64 and from there over the lines in cable 63 and 65 to the buffer tag address registers 66. This operation is represented by box 136 in FIG. 5b.

Following this operation, the control section 15 sends a "read" request to the main memory (box 138) which initiates the readout of the 8-word block designated by the address contained in the miss address register 62. Specifically, the contents of the miss address register are gated into the main memory address register 72 where they are available to select the desired block which was determined not to be resident in the buffer.

A read request is also sent by the control network 15 to each of the SASU's 24 and 26. This operation is represented by box 140 in FIG. 5b and the purpose thereof is to effect the unloading of the 8 words comprising the least recently used block. Specifically, and as will be more fully explained hereinbelow, this is accomplished by initiating the main control delay line in the network 15 which is arranged to be cycled four successive times. During each cycle, one word from each of the segments is read out from the buffers 30 and 34 by way of the buffer read registers 64 and loaded into a temporary holding register, i.e., the main memory write data registers 68. At the completion of the first cycle of the main control delay line, a load flip-flop in the control network 15 is set to indicate that the first two words from the buffers have been read out from the SASU and entered into the registers 68. Following the setting of this flip-flop the write data is transferred by way of the write data selectors to the main memory 36. This operation is represented by box 142. During the third cycle of the main control delay line, the writeback flip-flop contained in the control network 15 is set, provided the writeback bit of the tag associated with the least recently used block is set (box 144).

If a write enable is present and if the writeback flip-flop is set, during the fourth cycle of the main control delay line as words 7 and 8 of the least recently used block are being transferred to the main memory, the control unit 15 issues a main memory write request signal (box 146) which causes the memory to enter the block into the appropriate address. As the least recently used block was being unloaded from the SIU buffer and entered into the temporary holding registers the main memory was operating in response to the earlier read request to read therefrom the 8 words comprising the desired block into a temporary holding register in the main memory. At about the same time that the control unit 15 is presenting the write request to the main memory, the read data from the main memory is available and a transfer of the read data to the SASU buffers can be initiated. This data is transferred over the lines in cables 70 and by way of the buffer write selectors 20 and the buffer write register 22 in four cycles controlled by the SIU write mode main control delay line which is also contained in the control network 15.

The SIU write mode main control delay line is also cycled four times. During the first cycle therof, the contents of the requestor address register 18 is written into the block address portion of the tag word for the block which was earlier determined to be the least recently used block so that following this write operation, the tag word will specify the previously nonresident block which will become resident upon the completion of the entire data transfer from the main memory to the SIU buffer. Also, during each of the four buffer write cycles, the writeback bit of the tag word associated with the new block will be cleared. This is necessitated by the fact that during each write operation into the buffer, the writeback bit is automatically set, but during the entry of a replacement block there is a one-for-one correspondence between the data being entered in the buffer and the data for the corresponding block contained in the main memory. Hence, the writeback bit must be cleared on each of the four passes of the SIU write mode main control delay line so that upon completion of the replacement, the writeback bit for the replacement block will be cleared indicating that no modification has been made to this word since it was retrieved from the main memory. Also, during the entry of the replacement 8-word block in the SIU buffer, the age bits in the tag word for the replacement block are updated so that upon completion of the write operation into the buffer, the age bits for the replacement block will be such as to indicate that it is the most recently used entry. The transmission of the desired 8-word block from the main memory to the SASU, the entry of this block into the location previously identified as the LRU block and the updating of the tag address, age and the clearing of the writeback bit are represented in the flow diagram of FIG. 5b by boxes 148, 150 and 152.

Following the entry of the replacement block into the desired location in the SIU buffer, the main memory issues a write resume control signal which indicates to the control unit 15 that the writeback information has been stored away in the main memory. At about the same time, the main memory issues a read resume control signal which is presented to the SIU to indicate that the main memory read cycle has ended, i.e., the read data transmission has been completed. These operations are represented in the flow diagram of FIG. 5b by the boxes 154 and 156 respectively.

Following the generation of the read resume signal, the control network 15 next reinitiates the original requestor unit which had earlier given rise to the miss condition. The priority network 14 gives highest priority to this original requestor, causing the sequence of operations represented by the boxes 122 through 132 to be executed in the manner already described. That is, the sequence of operation exists the flow diagram of FIG. 5b at the connector symbol labeled 4 and enters the corresponding point in the flow diagram of FIG. 5a. A determination is made whether the requestor is presenting a write request and if so, the operations set forth in the flow diagram of FIG. 5c are executed in sequence. However, if the original request had been a read request, the operations represented by boxes 130 and 132 would be executed.

Figure 6:
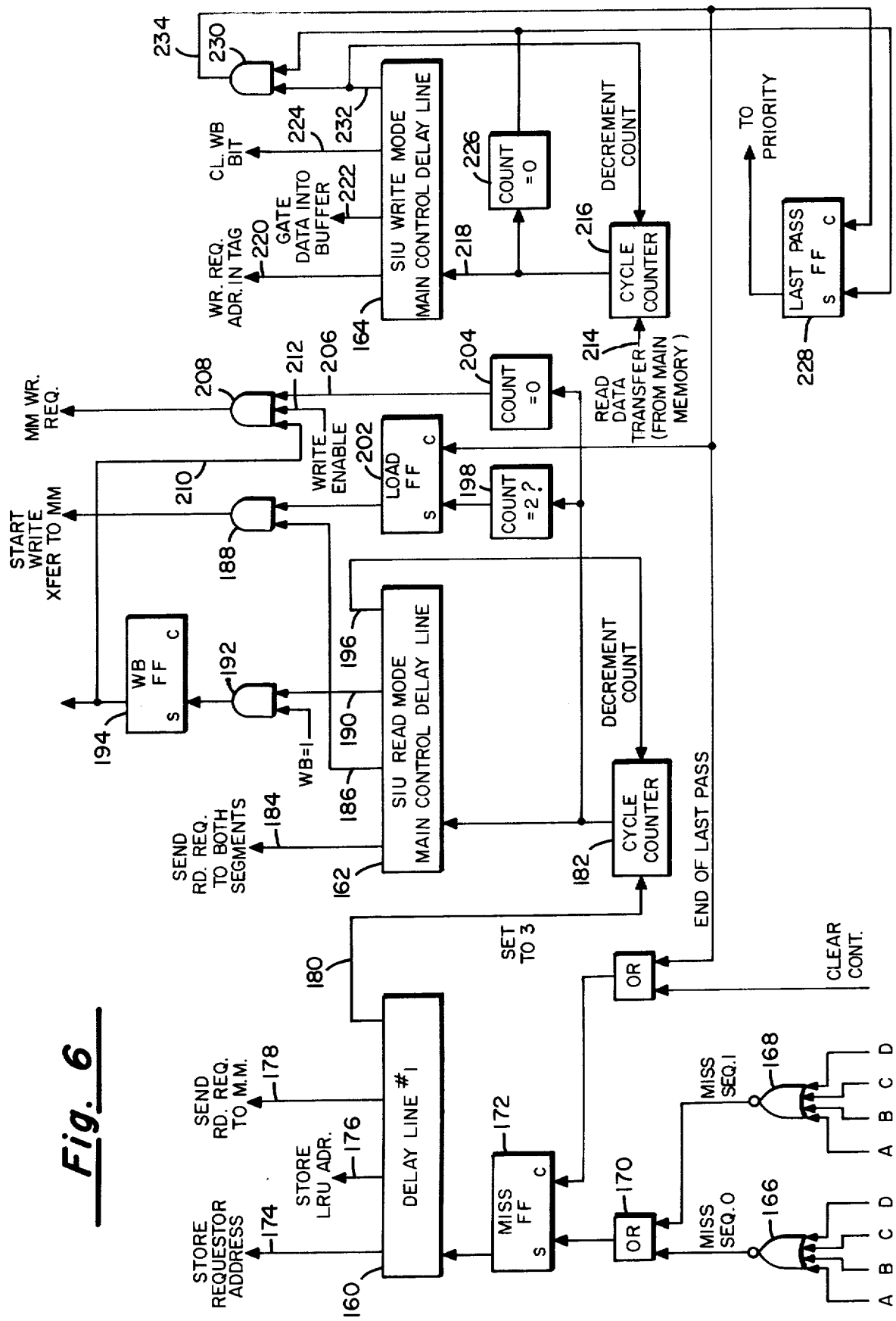
FIG. 6 illustrates by means of a logic diagram the control network used in the system of FIG. 1.

Referring now to FIG. 6, the details of the control network 15 of FIG. 1 will be explained.

The primary function of the control secton 15 is the orderly replacement of data stored in the SASU buffer with data stored in the main memory, and generally speaking, the following steps are involved:

A miss is detected in either the odd or the even segment.
Control presents a request to the main memory for the non-resident address.
Control unloads the least recently used (LRU) data from the SASU buffer.
The non-resident data from the main memory is written into the buffer and the new resident address is written into the tag section.
The LRU data previously unloaded is wirtten into the main memory if the data had been modified while resident in the buffer.
The original requestor regains priority and now has access to the desired data in the buffer.

The control network 15 produces the required enables and commands to the rest of the system at times and in a sequence such that the foregoing steps are accomplished. As is shown in FIG. 6, the control section comprises a plurality of delay lines 160, 162 and 164 and associated logic circuits for developing the requisite control signals. As is well known in the art, a delay line is a device possessing a finite pulse propagation time such that when a pulse is entered at the input thereof it travels down the line at a known rate, producing output pulses at taps located therealong. In computer networks, the sequentially produced pulses can be used as commands or enables for other units in the sytem.

The A, B, C and D outputs from the match compare circuit 42 (FIG. 2) for the odd segment are ORed together in network 166 such that if an address being sought by a requestor fails to compare with the addresses resident in the tag sement of the SASU the NOR circuit 166 will produce a miss signal. Similarly, NOR circuit 168 combines the A, B, C and D outputs from the even segment of the SIU to generate a miss signal at its output when the requested address fails to compare with the tags of the selected set in the even segment. The outputs from each of the circuits 166 and 168 are applied to an OR circuit 170 and if either of these two inputs in active, a signal is produced at the output of circuit 170 to set the miss flip-flop 172. The miss flip-flop has its set output terminal connected as an input to the delay line 160 and serves to enter a pulse into the line. This input pulse then travels down the line and sequentially produces the enables indicated. More specifically, at a first time, a pulse appears on the tap 174 which enables the gates (not shown) disposed between the requestor address register 18 and the miss address register 62 such that the contents of the requestor address register are gated into the miss address register 62 and temporarily stored for subsequent use.

At the same time that the SASU was being interrogated to determine whether a requested address was present therein, the circuitry of FIG. 4 was asynchronously operating to determine which of the four blocks of the selected set was the least recently used. Then, as the pulse traverses the delay line 160 at a predetermined time an enable signal appears at the tap 176 to cause the address of the least recently used block to be stored in the tag address register 64 and in the buffer tag address register 66.

At a subsequent time, the pulse traversing the delay line 160 causes an output at the tap 178 which serves as a read request control signal for the main memory. The conventional control circuits associated with the main memory respond to this request signal and effect a readout of the block of eight words having a starting address supplied from the miss address register 62 via the main memory address register 72.

Following the sending of the read request to the main memory, the pulse traversing the delay line 160 reaches tap 180 and is applied to a conventional counter network 182 which sets the counter to three (binary 11). The output from the cycle counter 182 is connected as an input to the delay line 162. When the cycle counter is advanced to three and on each subsequent decrementation thereof, a pulse is produced which is made to traverse the delay line 162. Accordingly, on the first cycle when the cycle counter registers three, the pulse entering the when the cycle counter register three, the pulse entering the delay line 162 travels along it and when the tap 184 is energized a read request is transmitted to both the odd and the even segments to initiate the unloading of the least recently used block. Next in time, the delay line 162 produces an output pulse at the tap 186 which is connected to a first input of an AND gate 188. At this time, however, gate 188 is disabled and is ineffective to produce the command for starting the write transfer to the main memory.

The next event to occur is when the pulse traversing the delay line 162 reaches the tap 190. If the writeback bit of the least recently used block tag contained in the tag address register 64 is set, the AND gate 192 will be fully enabled to effect the setting of the writeback flip-flop 194. Of course, if the writeback bit had not been set, indicating that no modification of the data corresponding to this address had occurred while the least recently used block was resident in the buffer, the gate 192 would not be enabled at this time and the writeback flip-flop would remain in its cleared condition.

When the pulse traversing delay line 162 reaches tap 196 it is fed back to the cycle counter 182 and used to decrement the counter by one. The decrementation of the cycle counter 182 again inserts a pulse on the input to the delay line 162, causing outputs to successively appear on the taps 184, 186, 190 and 196. In addition, when the count in the cycle counter 182 is decremented from three to two, the count equal to two comparator 198 outputs a signal on line 200 to set the load flip-flop 202. With the flip-flop 202 set, at the time that the pulse appears on tap 186 during the second iteration of the delay line 162, the gate 188 will be fully enabled and will produce the command to initiate the write transfer to the main memory. It will be recalled that during the first cycle of the delay line 162 that the pulse appearing at tap 184 was used to read words 0 and 1 of the selected block of the selected set from each of the buffer segments 30 and 34 via the buffer read registers 69 to the main memory write data register 68. On the second cycle of the delay line 162 the signal on tap 184 effects a readout of words 2 and 3 of the selected set of the selected block into the main memory write data register 68 and shortly thereafter the gate 188 is fully enabled to initiate the write transfer through the write data selectors 71 to holding registers in the main memory 36.

At the completion of the third cycle of operation of the delay line 162 a pulse appears at tap 196 to decrement the cycle counter to zero. When the cycle counter reaches zero, a comparator 204 detects this condition and applies an enable signal to an input line 206 of an AND gate 208. If at this time the writeback flip-flop is set a second enable signal will appear at the input terminal 210 of gate 208. With a write enable control signal present on conductor 212 the gate 208 will be fully enabled to thereby generate a main memory write request control signal. The effect of this write request is to cause the main memory to store away the block of data selected for replacement into the storage locations determined by the contents of the main memory address register 72.

A predetermined time following the production of the read request control signal at the tap 178 of delay line 160, the main memory control circuits produce a "read data transfer" signal. The time interval between the read request control signal and the read data transfer signal is designed so as to be sufficient to permit the main memory to read out the eight words comprising the desired block. The read data transfer signal is applied as an input to the cycle counter 216 by way of conductor 214. The effect of the signal on conductor 214 is to set the cycle counter 216 to a count of three (binary 11). The setting of the cycle counter 216 to three and the subsequent decrementing thereof causes a series of four successive pulses to be inserted at the input terminal 218 of the delay line 164. For every buffer write cycle of read data coming from the main memory, the delay line 164 present to each segment (odd and even) the original requestor's non-resident address and increments bits two and one thereof. During the first buffer write cycle when the first pulse entered on input terminal 218, it traverses the delay line so as to produce an output on tap 220, enabling a new resident address to be stored in the tag portion of the SASU's 24 and 26. The address entered is the previously missing requestor address obtained from the buffer tag address register 66 via selectors 16 and the requestor address registers 18. The tag address is written into the most recently used block location. This youngest age block had been the least recently used address that had been unloaded during the four cycles of the delay line 162, but because of the nature of the read cycles, the tag age bits were automatically updated to the newest age value.

During each cycle when a pulse appears at the tap 222 of delay line 164, a command enable is generated to gate the read data from the main memory into the appropriate buffer location. Subsequently, during each of the four cycles of operation of delay line 164 a pulse appears at tap 224 and is used to clear the writeback bit. This is necessitated by the fact that the tag memory automatically sets the tag writeback bit whenever the buffer location associated therewith is written or modified. Hence, the control network must clear the writeback bit during each buffer write operation so that is will not later appear that what is entered into the SIU buffer is different from the corresponding block contained in the main memory.

When words 7 and 8 of the desired block from the main memory have been read into the buffer on the fourth cycle of the delay line 164, the count contained in the cycle counter 216 has been reduced to zero and this fact is detected by the count equal to zero comparator 226. When he count becomes equal to zero a signal is produced at the output of the comparator 226 to set the last pass flip-flop 228. The output of the last pass flip-flop is connected to the priority network 14 and is used to advise the priority section to enable external requestors at the completion of the last cycle of operation of the delay line 164. The completion of the last cycle is detected by the AND gate 230. More specifically, the output from the count equal to zero comparator 226 is ANDed together with a signal generated at tap 232 of the delay line, such that only on the last pass through the delay line will the AND gate 230 be enabled to produce an output signal on conductor 234. This last mentioned signal is used to clear or reset each flip-flop in the control section of FIG. 6 that contains information about the miss cycle. That is, the last pass flip-flop 228, the load flip-flop 202 and the miss flip-flop 172 are each cleared at the end of the four cycles of operation of delay line 164.

Upon the completion of the last pass cycle, the priority section reinitiates the original requestor and affords it top priority. As a result, the requestor will now be able to readout from the SIU buffer the newly stored data in satisfaction of the earlier request.

The above description has been of one embodiment only by way of example and it should be appreciated by those skilled in the art that a number of modifications can be made without departing from the scope of the invention.

Except for the specifics of the control network 15 which have been fully described herein, the remaining components and circuit arrangements depicted in FIG. 1 of the drawings as block elements are deemed to be conventional and, accordingly, no further explanation need be given concerning their construction and mode of operation.

What is claimed is:

1. In a digital computing system of the type including a relatively large capacity, high cycle time main memory for storing plural blocks of information, a small capacity, high speed buffer memory for storing subsets of said blocks of information contained in said main memory at addressable locations therein, a plurality of requestor units for addressing information stored in said buffer memory, a tag storage device for storing the addresses of those blocks of information stored in said main memory which are currently contained in said high speed buffer memory as well as age bits indicative of the relative order in which said blocks of information contained in said high speed buffer memory had been addressed by said requestor units, the combination comprising:
   a. a plurality of comparator networks having first and second inputs and an output said comparators indicating whether the number represented by the binary digits applied to said first input are greater than, equal to or less than the number represented by the binary digits applied to said second input;
   b. means for applying the age bits associated with predetermined blocks of information in said buffer memory individually to said first inputs of said plurality of comparator networks;
   c. means for applying the age bits associated with the block of information in said buffer memory currently being addressed by one of said requestor units to said second inputs of all of said comparator networks; and
   d. adder means connected to the outputs of said comparator networks for adding 0, clearing or adding 1, to the age bits of the predetermined blocks which were applied to said first inputs of said comparator networks when the number represented by the age bits applied to said first inputs are greater than, equal to or less than the number represented by the age bits applied to said second inputs, respectively whereby, in dependence upon the new age bits of the blocks, a decision may be made as to replacement of a block based on relative usage of the block.

2. In a digital data processing system of the type including a relatively large capacity slow cycle time main memory for storing M sets of N blocks of data, each P-words in length at addressable locations therein; a plurality of requestor units for providing address representing signals, data representing signals and request control signals, a storage interface unit comprising in combination:
   A. a relatively low capacity fast cycle time buffer memory for storing in a first section thereof M sets of n blocks of data, each P-words in length at addressable locations therein, where $n < N$ and for storing in a second section thereof M tag words, each of said tag words including;
      a. n block address fields for specifying which of the N blocks in a given set in said main memory are also resident in a corresponding set in said first section of said buffer memory at any given time; and
      b. a modification indicator for indicating when data in said n blocks specified by said n block address field are different from the data stored in the corresponding N blocks in said main memory;
   B. priority determining means responsive to said request control signals from said plurality of requestor units for selecting only one of said requestor units at a time to supply said address representing signals to said buffer memory;
   c. means responsive to said address representing signals from said one of said requestor units for reading out from said buffer memory a tag word for a desired set;
   D. match detecting means responsive to the bit permutations of said tag word in the buffer for said desired set and to said address representing signals from said one of said requestor units for producing a miss control signal when the $n$ blocks in the buffer of said desired set do not include a desired block corresponding to said desired set;
   E. control means responsive to said miss control signal for selecting one of said $n$ blocks in said desired set in said buffer memory for replacement on a block basis by said desired one of said N blocks in said main memory; and
   F. means connected to receive said modification indicator and connected to said buffer memory and said main memory for updating main memory by storing said one of said $n$ blocks of the buffer selected for replacement in said main memory at the address specified by said address representing signals from said one of said requestor units only when said modification indicator is of a predetermined binary significance.

* * * * *